(12) United States Patent
Muramoto et al.

(10) Patent No.: US 6,961,580 B2
(45) Date of Patent: Nov. 1, 2005

(54) WIRELESS COMMUNICATION SYSTEM AND METHOD OF MAXIMIZING THE USE OF COMMUNICATION SIGNAL RESOURCE

(75) Inventors: Mitsuru Muramoto, Tokyo (JP); Kanemi Sasaki, Tokyo (JP)

(73) Assignee: Hitachi Kokusai Electric, Inc., Tokyo (JP)

(*) Notice: Subject to any disclaimer, the term of this patent is extended or adjusted under 35 U.S.C. 154(b) by 635 days.

(21) Appl. No.: 09/998,712

(22) Filed: Nov. 30, 2001

(65) Prior Publication Data

US 2002/0072373 A1 Jun. 13, 2002

(51) Int. Cl.[7] .................................................. H04Q 7/20
(52) U.S. Cl. .................. 455/466; 455/562.1; 455/422.1
(58) Field of Search ................................. 455/446, 447, 455/422.1, 403, 561, 562.1; 370/329, 330, 334, 328, 337

(56) References Cited

U.S. PATENT DOCUMENTS

| | | | | |
|---|---|---|---|---|
| 6,212,388 B1 | * | 4/2001 | Seo ............................ | 455/450 |
| 6,304,762 B1 | * | 10/2001 | Myers et al. ............. | 455/562.1 |
| 6,418,316 B2 | * | 7/2002 | Hildebrand et al. ......... | 455/447 |
| 6,542,746 B1 | * | 4/2003 | Dean .......................... | 455/447 |
| 6,748,218 B1 | * | 6/2004 | Johnson et al. .............. | 455/446 |

* cited by examiner

Primary Examiner—Jean Gelin
(74) Attorney, Agent, or Firm—Knoble Yoshida & Dunleavy LLC

(57) ABSTRACT

The cell expansion system and method maximize the use of communication signal resource such as frequencies and polarized waves in expanding base stations for wireless communication. The cell are divided into four equal sectors, and at least a pair of adjacent sectors of the adjacent cells shares a common signal for wirelessly communicating with each other.

47 Claims, 5 Drawing Sheets

(a)

(b)

(c)

WIRELESS COMMUNICATION SYSTEM AND METHOD OF MAXIMIZING THE USE OF COMMUNICATION SIGNAL RESOURCE

FIELD OF THE INVENTION

The current invention is generally related to wireless communication systems and methods, ad more particularly related to the systems and methods of maximizing the use of communication signal resources such as frequencies and polarized waves.

BACKGROUND OF THE INVENTION

Among wireless communication systems, wireless local loop (WLL) or fixed wireless access (FWA) are known for wireless subscriber access systems. As shown in FIG. 8, via wireless communication, a base station 1 that a telecommunication enterprise places, communicates with a plurality of subscriber stations 2 at residential sites. Each of the subscriber stations 2 is connected to a local network (LAN) 3 for data communication. Furthermore, the base station 1 is connected to other subscriber LANs for data communication via back-bone networks 4 such as public networks that are connected to the base station 1. The base station 1 has a plurality of subscriber stations 2, and the multi-directional wireless facility is called point-to-multi points (P-MP) SYSTEM. By distributing a plurality of the above described base stations 1, a predetermined area is covered for providing wireless service to many subscriber stations 2. In order to efficiently use the frequency resource, the same frequency must be repeatedly used for the above communication such as automobile phones and hand-held wireless phones. However, to avoid interference, the same frequency has not been used between adjacent base stations.

The above P-MP systems generally utilize high frequencies such as semi-millimeter waves or a millimeter waves. Since wireless communication is established via high efficiency antennas, the standards have been determined by ARIB STD-T59. According to the standard, the communication frequency utilizes the 26 $GH_2$-band or the 38 $GH_2$ band and the high efficiency antenna over 20 dBi at a subscriber station. For the above reasons, directional antennas such as parabolic antennas and sector antennas are used at the base station 1 to use the repeated frequency for implementing the high efficiency. By placing a plurality of parabolic antennas at the base stations and directing them at a predetermined angle with each other, the horizontal directions are divided into a plurality of sectors for implementing the repeated frequency use for the high efficiency. As shown in FIG. 9, the sector antenna includes a circular disk antenna base plate 10, which is divided into four sectors A through D by an insulation plate 11 and an antenna element 12 at each of the four sectors A through D for antenna directionality. The sectors A through D divide the horizontal directions into four for the repeated frequency use.

In the subscriber wireless access system, the interference between the sectors due to the repeated frequency use is avoided by the directional antenna 7 at the mobile subscriber station 2 that are included in each sector of the base station 1. Japanese Patent Publication Hei 10-42352 disclosed a method of forming cells in a wireless communication system in which a large area is covered by a plurality of communication cells that are created by a plurality of distributed base stations. The communication service area is formed around the base station that is located at an approximate center of the communication service area. According to the above disclosure, as shown in FIG. 10, each base station B1 through B4 has a communication service area as indicated by a hexagonal, and a separate frequency or channel for each antenna or sector is indicated by F1 through F3. In The above prior art, a common frequency is used for m sectors in a cell so that interference between sectors is avoided. Using the above configuration, a subscriber station C1 belongs to a sector that utilizes the channel F2 for the base station B2. The transmission paths of a subscriber station C1 are indicated by arrows. The nearest base station B4 has the highest probability for giving or receiving interference with respect to the subscriber station C1. The above described interference level due to the same channel over one cell does not cause a practical problem to maintain a predetermined communication quality. However, the actual base station placement is not often according to a plan or an advanced design due to surrounding environment and the procurement of the installation location. Because of the deviated actual placement location of the base stations, interference may occur between the cells. FIG. 11 shows an example of the placement deviations of the base station B3 from an original installation location. The subscriber station C2 that belongs to a sector using the channel F2 of the base station B3 possibly has interference with a sector using the channel F2 of the adjacent base station B2. With the hexagonal cell configuration, at least three cells are necessary for cell expansion. At the same time, even if four channels are available, it is difficult to use the four channels in an efficient manner. For the above reasons, it is desired to provide a wireless communication system having an implementable cell placement with at least two channels for preventing interference between adjacent cells.

SUMMARY OF THE INVENTION

In order to solve the above and other problems, according to a first aspect of the current invention, a method of constructing wireless telecommunication cells between base stations and subscriber stations, the base stations each having a cell, the cell having a predetermined number of sectors, including the steps: dividing each of the cells into four sectors around each of the base stations; assigning distinct communication signals in a substantially mirror-image pattern respectively to the four sectors at each of the base stations so that a common one of the distinct communication signals is assigned to at least a pair of adjacent ones of the sectors of the corresponding two adjacent ones of the cells; and transmitting within a predetermined directionality the assigned distinct communication signals in each of the four sectors between the base stations and the subscriber stations in the corresponding cells.

According to a second aspect of the current invention, a wireless telecommunication system, including: base stations for wirelessly communicating via a predetermined number of distinct communication signals; four directional antennas located around each of the base stations for receiving and transmitting the distinct communication signals within a predetermined directionality for the base stations, the four directional antennas collectively defining a cell for a corresponding one of the base stations, each of the four directional antennas singularly defining a sector for the corresponding cell, at least a pair of adjacent ones of the four directional antennas of the corresponding two adjacent ones of the base stations utilizing a common one of the distinct communication signals in a substantially mirror-image pattern; and subscriber stations located in the cell for wirelessly communicating with a corresponding one of the base stations on one of the distinct communication signals.

According to a third aspect of the current invention, a wireless telecommunication system, including: base stations for wirelessly communicating via distinct communication signals; a plurality of directional antennas located around each of the base stations for receiving and transmitting the distinct communication signals for the base stations, the directional antennas collectively defining a cell for a corresponding one of the base stations, each of the directional antennas having a limited directionality for singularly defining an equal portion of the cell as a sector, a pair of adjacent ones of the directional antennas of the corresponding two adjacent sectors of the base stations utilizing a common one of the distinct communication signals in a substantially mirror-image pattern; and subscriber stations located in the cell for wirelessly communicating with a corresponding one of the base stations on one of the distinct communication signals.

According to a fourth aspect of the current invention, a wireless telecommunication system, including: base stations for wirelessly communicating via distinct communication signals; a plurality of directional antennas located around each of the base stations for receiving and transmitting the distinct communication signals for the base stations, the directional antennas collectively defining a cell for a corresponding one of the base stations, each of the directional antennas having a limited directionality for singularly defining an equal portion of the cell as a sector, of the plurality of said adjacent ones of the directional antennas of the corresponding adjacent ones of the base stations utilizing a common one of the distinct communication signals in a substantially mirror-image pattern; and subscriber stations located in the cell for wirelessly communicating with a corresponding one of the base stations on one of the distinct communication signals.

According to a fifth aspect of the current invention, a wireless telecommunication system, including: base stations for wirelessly communicating via distinct communication signals; a plurality of directional antennas located around each of the base stations for receiving and transmitting the distinct combinations of frequencies and polarized waves for the base stations, the directional antennas collectively defining a cell for a corresponding one of the base stations, each of the directional antennas having a limited directionality for singularly defining an equal portion of the cell as a sector, the plurality of the adjacent ones of the directional antennas of the corresponding adjacent ones of the base stations utilizing a common one of the distinct combinations of the frequencies and polarized waves in a substantially mirror-image pattern; and subscriber stations located in the cell for wirelessly communicating with a corresponding one of the base stations on one of the distinct communication signals.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
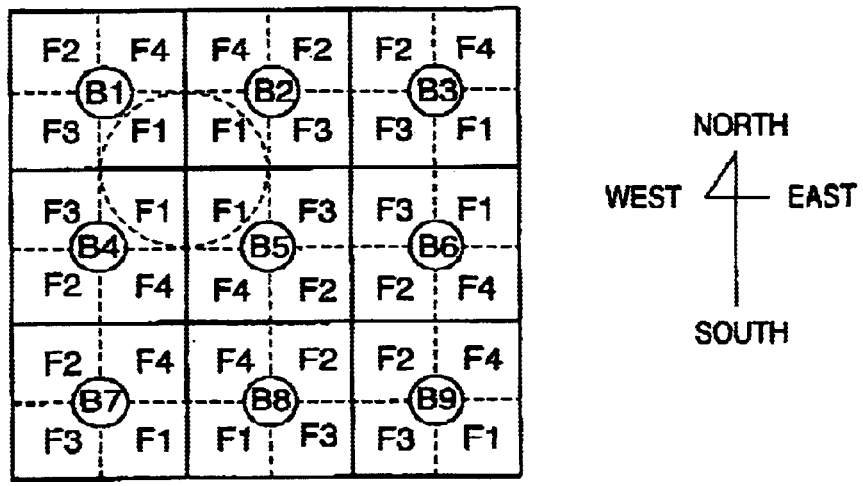
FIG. 1 is a diagram illustrating a preferred embodiment of the wireless communication system according to the current invention.

Referring now to the drawings, wherein like reference numerals designate corresponding structures throughout the views, and referring in particular to FIG. 1, a diagram illustrates a preferred embodiment of the wireless communication system according to the current invention. The diagram illustrates two-dimensional service areas for base stations B1 through B9 and frequencies F1 through F4 that are used for each sector. Although the sectors are placed with respect to north, south, east and west in the preferred embodiment, the sector placement is not limited to the above example. At the base station B5, the frequencies F1, F2, F3 and F4 are respectively used in a north-western sector, a south-eastern sector, a north-eastern sector and a south-western sector. In the cells in the base stations B4 and B6 in the east and west directions of the cell B5, the frequencies of the east and west sides are switched in a mirror image. In other words, the base stations B4 and B6 each have a mirror sector arrangement of the base station B5 by switching the frequencies F1 and F3 as well as frequencies F4 and F2. Similarly, in adjacent cells in the north and south direction of the cell B5, the frequencies of the frequencies of the northern and southern sides are switched. In other words, the base stations B2 and B8 each have a mirror sector arrangement of the base station B5 by switching the frequencies F1 and F4 as well as frequencies F2 and F3. According to the above described rule for placing each of the four cells, the adjacent sectors of the adjacent cells use a common frequency as indicated by a dotted circular line in FIG. 1. A fixed terminal station that is installed in each of the sectors does not interfere with other base stations by directing its communication signal to respective base stations. In other words, according to the above rule, sectors in the cells that are adjacent to the base station B5 in the north-eastern, north-western, south-eastern and south-western directions have the frequencies in a mirror image along respective directions.

In the subscriber wireless access system, each of the fixed subscriber stations is required to have an antenna having over 20 dB according to the ARIB STD-T59 standard. Directional antennas such as parabolic antennas are generally used. Since the above high efficiency antennas have a narrow beam area, there is no interference among the four adjacent sectors that use the same frequency. For example, since the fixed subscriber station belonging to a sector using the frequency F1 is directed towards the base station B5, there is no interference with the sectors using the frequency F1 in the cells of the base stations B1, B2 and B4.

Figure 2:
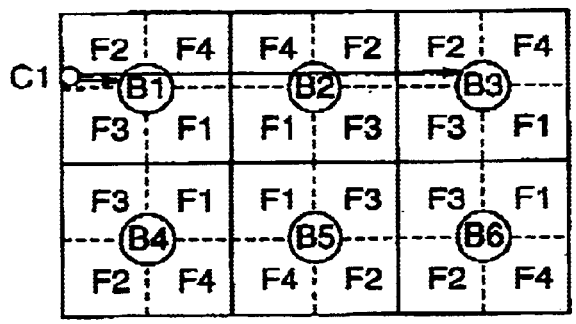
FIG. 2 is a diagram illustrating a possibility for interference with other cells around other base stations in the above described cell placement arrangement.

Now referring to FIG. 2, a possibility for interference with other cells around other base stations is illustrated in the above described cell placement arrangement. A subscriber station C1 belongs to the sector using a frequency or channel F2 in a cell around the base station B1. As indicated by arrows, the nearest sectors that are possibly interfered or that possibly interfere due to the common channel F2 at the subscriber station C1 are sectors using the channel F2 in the cells of the base station B3. The above interference is caused by the same direction of the antenna for the sector using the frequency F2 with respect to the base station B3 as that of the antenna in the sector also using frequency F2 in the cell around the base station B1. Because of the same directionality, the both antennas around the base stations B1 and B3 receive the common transmission signal on the channel F2 to cause some undesirable interference. On the other hand, although the sector uses the frequency F2 in the cell around the base station B2, since the antenna for the frequency F2 is directed towards the base station B2, the use of the channel F2 by the base station B1 causes no interference with base station B2. The above described interference is practically a non-issue since the interference is not between the two immediately adjacent cells but across at lease on cell. Furthermore, the actual base station placement is often not according to the theoretical design and is affected by factors such as surrounding environment and the procurement of the installment sites.

Figure 3:
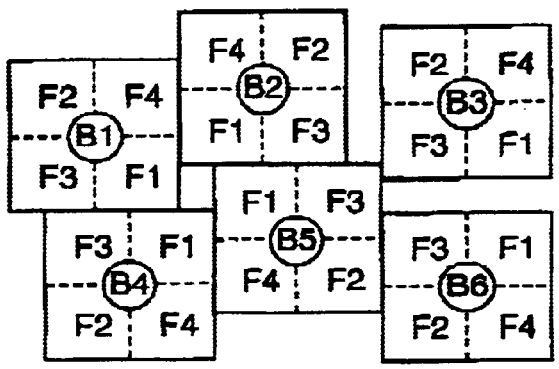
FIG. 3 is an exemplary placement of the base stations is deviated from the designed positions of the preferred embodiment according to the current invention.

Now referring to FIG. 3, an exemplary placement of the base stations is deviated from the designed positions of the preferred embodiment according to the current invention. No interference is observed for the single channel use between the two immediately adjacent base stations. Only a theoretical possibility exists for interference between every other cell. Furthermore, since the subscription wireless access system accomplishes communication using sub-millimeter waves or millimeter waves, a fixed subscriber station antenna and a base station antenna have to be located so that no interfering objects exist between them. However, due to post-installment construction such as a new building or a post-installment environmental change, the transmission does not necessarily remain free from any interfering objects. In the above example, since three other base stations that surround a subscriber station use the same frequency, the subscriber station is likely to communicate with any of other base stations by changing the direction of the subscriber station antenna without altering the communication frequency or channel. The communication connectivity is thus maintained by the above described simple directional change of the subscriber station antenna in response to an environmental change.

Figure 4:
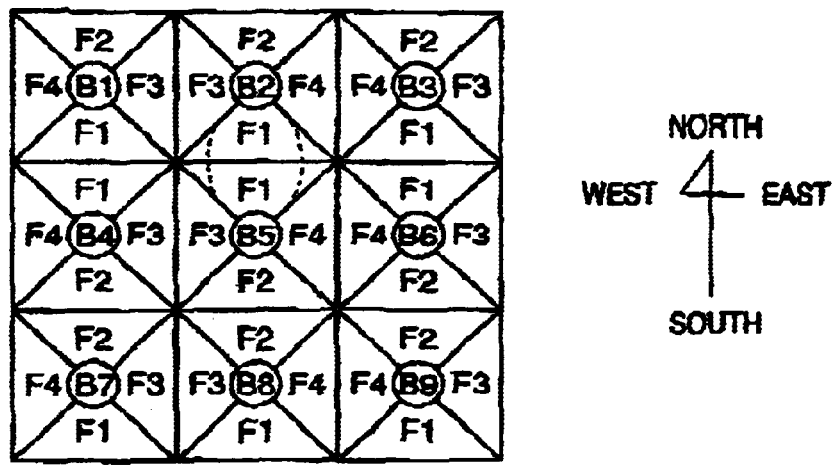
FIG. 4 is a diagram illustrating a second preferred embodiment of the wireless communication system using the sector frequencies in the base station according to the current invention.

Now referring to FIG. 4, a diagram illustrates a second preferred embodiment of the wireless communication system using the sector frequencies in the base station according to the current invention. The frequencies F1 through F4 are used among the base stations B1 through B9. Although north, south, east and west are used to describe the relational positions in the second preferred embodiment, the placement in the second preferred embodiment is not limited to the above positional requirements. Around the base station B5, four sectors are designated as north, east, south and west, and each sector utilizes a predetermined frequency F1, F4, F2 or F3 in the above enumerated position. In the adjacent cells that are located in the east-west directions from the base station B5, the eastern and western sectors switch the frequencies. In other words, the base stations B4 and B6 each have the sector arrangement in their cell that the sectors using the frequencies F3 and F4 are switched in a mirror image. Similarly, in the adjacent cells in the north and south directions from the base station B5, the northern and southern sectors switch their frequencies. In other words, the base stations B2 and B8 each have the sector arrangement in their cell that the sectors using the frequencies F1 and F2 are switched in a mirror image. According to the above rule, cells are arranged in the second preferred embodiment. As indicated by a circular dotted line, a pair of adjacent sectors of the adjacent cells uses the same frequency. Fixed terminal stations in each sector are directed towards a corresponding base station, and no interference occurs with other base stations. In other words, according to the above rule, the cells adjacent to the base station B5 in the north-eastern, north-western south-eastern and south-western directions have a mirror image frequency arrangement along the respective directions.

Figure 5:
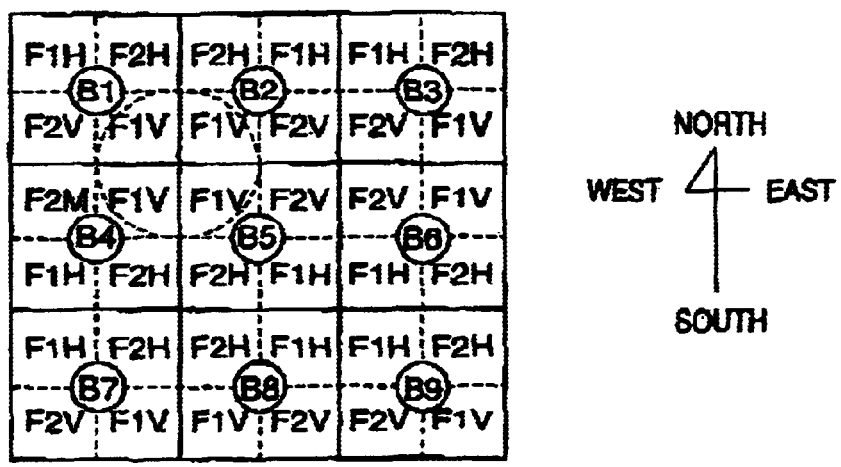
FIG. 5 is a diagram illustrating a third preferred embodiment of the wireless communication using the sector frequencies in the base station according to the current invention.

Referring to FIG. 5, a diagram illustrates a third preferred embodiment of the wireless communication using the sector frequencies in the base station according to the current invention. The frequencies F1 and F2 are used among the base stations B1 through B9. At either of the frequencies F1 and F2, vertically polarized waves V and horizontally polarized waves H are combined. Although north, south, east and west are used to describe the positional relations, the third preferred embodiment is not limited to the above positional relations. At the base station B5, the cell is divided into four sectors including the north-western, north-eastern, south-eastern and south-western sectors, and the antennas are respectively directed toward the above four directions. The polarized frequencies F1V, F2V, F1H and F2H are respectively used in the above enumerated four sectors. As described with respect to the first preferred embodiment, the eastern and western sectors of the adjacent cells in the east-west directions are switched in a mirror image. Similarly, the northern and southern sectors of the adjacent cells in the north-south directions are also switched in a mirror image. According to the above rule, as indicated by a circular dotted line, the adjacent sectors of the adjacent cells use the same frequency with the same polarity. Fixed terminal stations in each sector are directed towards a corresponding base station, and no interference is observed with other base stations. In other words, the cells adjacent to the base stations B5 in the north eastern, north western, south eastern and south western directions each have a mirror sector arrangement of the frequency and the polarity of the base station B5. Alternatively, right-handed circular polarized waves and left-handed circular polarized waves are used in lieu of the horizontal and vertical frequency waves.

Figure 6:
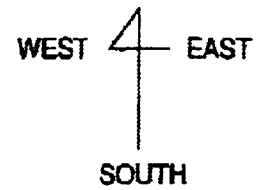
FIG. 6 is a diagram illustrating a fourth preferred embodiment of the wireless communication system using the sector frequencies and alternate waves according to the current invention.

Referring to FIG. 6, a diagram illustrates a fourth preferred embodiment of the wireless communication system using the sector frequencies and alternate waves according to the current invention. The frequencies F1 through F4 are used among base stations B1 though B9. At either of the frequencies F1 and F2, vertically polarized waves V and horizontally polarized waves H are combined. Although the sectors are described with respect to north, south, east and west for their relative positions, the positional relations may be described in other relative terms. The relative positions of the vertically polarized waves V are the same as those of the first preferred embodiment. Assuming that the cells are already expanded based upon the first preferred embodiment, the base stations have four sectors using the vertical frequency waves V. When a new base station is to be added in an existing cell, the position of the new base station is at the same location as that of the existing base station. For this reason, the new base station location is not indicated in FIG. 6. At the new base stations a different horizontally polarized wave H is used to avoid interference with the existing base station. Furthermore, the fourth preferred embodiment has the sector frequency arrangement in which the newly added base station has the frequencies that are shifted by two sectors in the counter clock wise direction from those of the existing base station to avoid interference within the same sector by reversing the polarity or the shifted frequencies. Based the above described cells having sectors with certain frequencies and polarized waves, the rule similar to the one used for the first preferred embodiment is applied to the fourth preferred embodiment. As indicated by a dotted circular line, since the adjacent sectors of the adjacent cells have the same frequency and polarized waves and the fixed terminal stations in each sector are directed towards a corresponding base station, no interference is caused with other base stations. In other words, according to the current rule, the adjacent cells from the base station B5 in the northern, eastern, southern and western directions have the sector frequencies and polarized waves that are a mirror image of those of the base station B5. Instead of adding a base station in an existing service area, two base stations are placed in the same area from the beginning, and the same results are also obtained. Although each of the above preferred embodiments uses two or four frequencies or channels in order to expand the cells, the distance between cells is further increased for the single channel interference by combining the above preferred embodiments.

Figure 7:
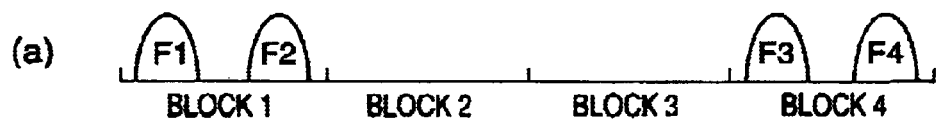
FIG. 7 is a diagram illustrating a fifth preferred embodiment of the wireless communication using frequencies for sectors according to the current invention.
Figure 7:
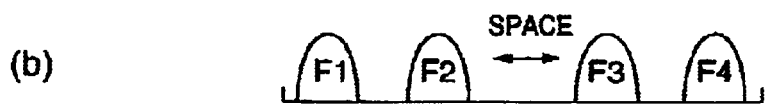
Figure 7:
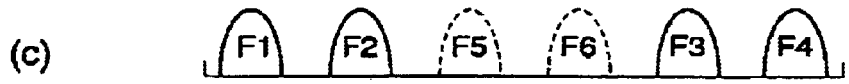
Figure 8:
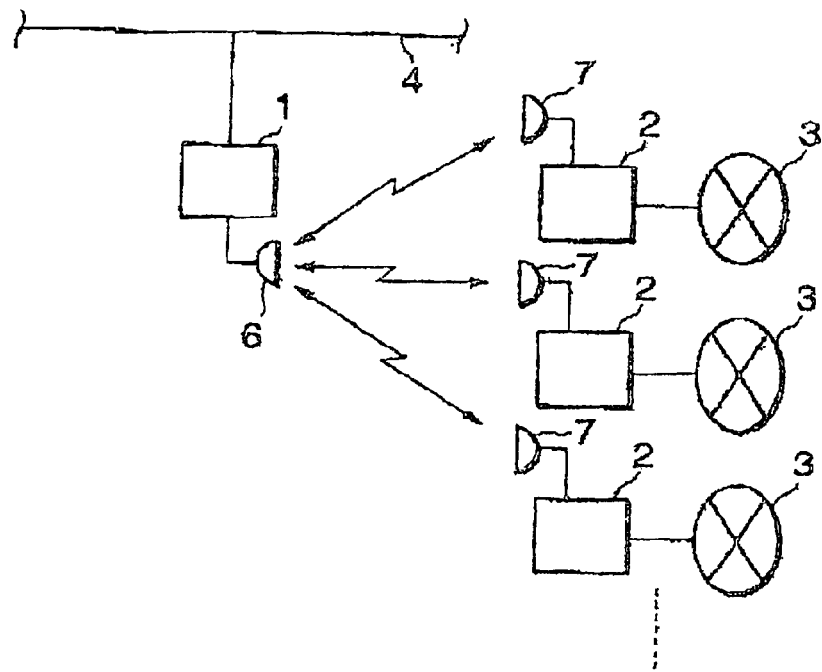
FIG. 8 is a diagram illustrating a wireless local loop (WLL) or fixed wireless access (FWA) for wireless subscriber access systems.
Figure 9:
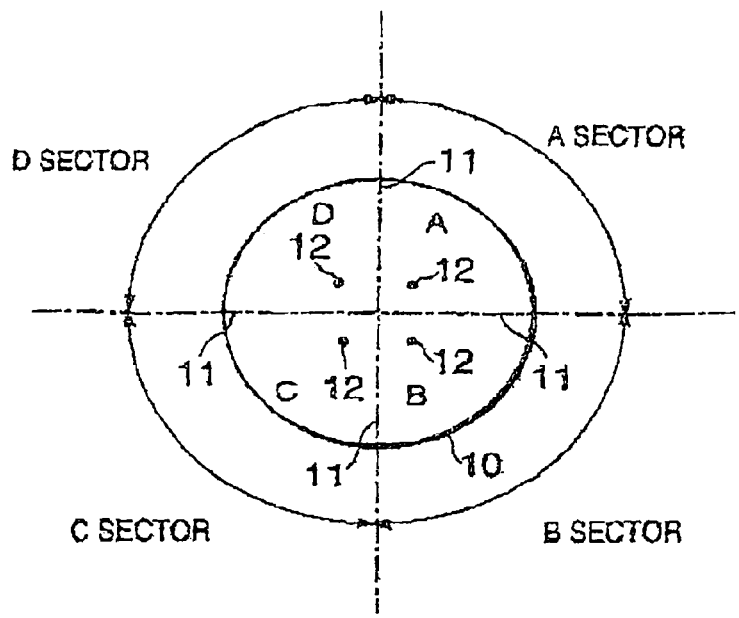
FIG. 9 is a diagram illustrating a sector antenna.
Figure 10:
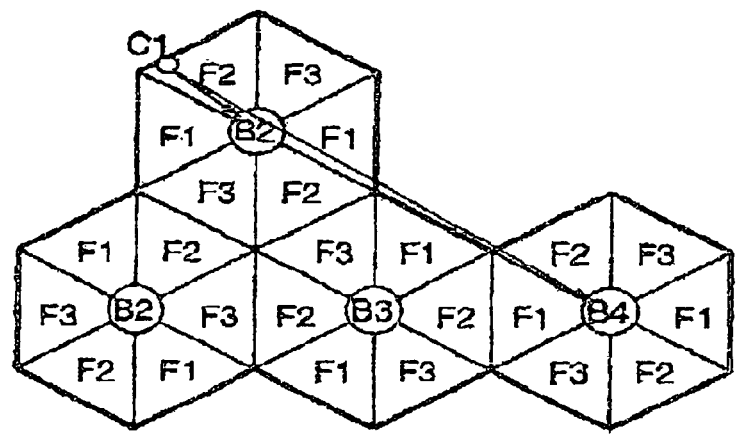
FIG. 10 is a diagram illustrating each base station has a communication service area as indicated by a hexagonal and a separate frequency or channel for each antenna or sector.
Figure 11:
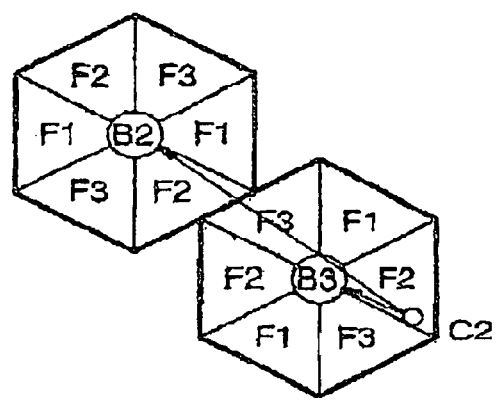
FIG. 11 shows an example of the placement deviations of the base station from an original installation location.

Now referring to FIG. 7, diagrams illustrate a fifth preferred embodiment of the wireless communication using frequencies for sectors according to the current invention. The fifth preferred embodiment has four sectors at a base station with distinct frequencies F1, F2, F3 and F4. The frequencies F1 through F4 are placed in the clockwise direction as shown in FIG. 1 and have either of the following relations: F1<F2<F3<F4 or F1>F2>F3>F4. Alternatively, the frequencies F1 through F4 are placed in the counter clockwise direction. It is desirable to have a large interference reduction factor (IRF) between adjacent sectors in the same cell. The frequency difference between the adjacent sectors is also made as large as possible. Assuming that the frequencies have the relation F1<F2<F3<F4, the sectors with the frequencies F2 and F3 become adjacent. Although there is no problem if the IRF value is sufficiently large between the sectors, the frequency resource is most efficiently utilized in the following manner. According to ARIB-STD-T59, the frequencies are applied on a block basis where the usable frequency band is divided into some blocks. As shown in FIG. 7(a), for each block, two channels are placed. In a block 1, channels F1 and F2 are placed, and the block 1 and a block 4 are used. Similarly, as shown in FIG. 7(b), the frequency difference between the frequencies F2 and F3 is made larger than the difference between the frequencies F1 and F2 or between the frequencies F3 and F4. The adjacent sectors between the frequencies F2 and F3 have a sufficiently large IRF. Thus, The adjacent sectors in the same cell are prevented from having interference. Furthermore, when more than five channels are place din a block, as shown in FIG. 7(c), spare channels F5 and F6 are provided between the frequencies F2 and F3.

As described above, by a certain unique cell placement for having a common frequency and frequency wave among the adjacent sectors of the adjacent cells, the preferred embodiments of the wireless communication system according to the current invention provide the cell expansion with at least two channels. Furthermore, the preferred embodiments of the wireless communication systems cause no single frequency interference around the adjacent cells even when the cells are placed at some deviated position.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of constructing wireless telecommunication cells between base stations and subscriber stations, the base stations each having a cell, the cell having a predetermined number of sectors, comprising the steps:

dividing each of the cells into four sectors around each of the base stations;

assigning distinct communication signals in a substantially mirror-image pattern respectively to the four sectors at each of the base stations so that a common one of the distinct communication signals is assigned to at least a pair of adjacent ones of the sectors of the corresponding two adjacent ones of the cells; and transmitting within a predetermined directionality the assigned distinct communication signals in each of the four sectors between the base stations and the subscriber stations in the corresponding cells.

2. The method of constructing wireless telecommunication cells according to claim 1 wherein the subscriber stations are fixedly located in a predetermined one of the sectors in a predetermined direction with respect to the base stations.

3. The method of constructing wireless telecommunication cells according to claim 1 wherein the sectors are substantially equal four areas.

4. The method of constructing wireless telecommunication cells according to claim 1 wherein the sectors are substantially rectangular in shape.

5. The method of constructing wireless telecommunication cells according to claim 1 wherein the sectors are substantially square in shape.

6. The method of constructing wireless telecommunication cells according to claim 5 wherein the cells are substantially square in shape.

7. The method of constructing wireless telecommunication cells according to claim 6 wherein the cells are staggered with each other.

8. The method of constructing wireless telecommunication cells according to claim 1 wherein the sectors are substantially triangular in shape.

9. The method of constructing wireless telecommunication cells according to claim 8 wherein the sectors are substantially equal four areas.

10. The method of constructing wireless telecommunication cells according to claim 9 wherein the cells are substantially square in shape.

11. The method of constructing wireless telecommunication cells according to claim 1 wherein a number of the distinct communication signals is four.

12. The method of constructing wireless telecommunication cells according to claim 1 wherein the common one of the distinct communication signals is respectively assigned to two pairs of two adjacent sectors of the corresponding two adjacent cells.

13. The method of constructing wireless telecommunication cells according to claim 12 wherein the common one of the distinct communication signals is assigned to four adjacent sectors of the corresponding four adjacent cells.

14. The method of constructing wireless telecommunication cells according to claim 1 wherein the distinct communication signals are each a combination of distinct frequencies and distinct communication wave directionalities.

15. The method of constructing wireless telecommunication cells according to claim 14 wherein two of the distinct communication signals are assigned to each of the sectors.

16. The method of constructing wireless telecommunication cells according to claim 1 wherein the distinct communication signals are four distinct frequencies as denoted by F1, F2, F3 and F4.

17. The method of constructing wireless telecommunication cells according to claim 16 wherein the four distinct frequencies have a relation as defined by F1<F2<F3<F4.

18. The method of constructing wireless telecommunication cells according to claim 16 wherein the four distinct frequencies have a relation as defined by F1>F2>F3>F4.

19. The method of constructing wireless telecommunication cells according to claim 1 wherein the four frequencies are assigned in order of F1, F4, F2 and F3 to the sectors of the cell.

20. The method of constructing wireless telecommunication cells according to claim 19 wherein the four frequencies F1, F4, F2 and F3 are assigned to the sectors in a clockwise direction.

21. The method of constructing wireless telecommunication cells according to claim 19 wherein the four frequencies F1, F4, F2 and F3 are assigned to the sectors in a counterclockwise direction.

22. The method of constructing wireless telecommunication cells according to claim 19 wherein a first difference between F2 and F3 is larger than a second difference between F1 and F2 and a third difference between F3 and F4.

23. A wireless telecommunication system, comprising:
base stations for wirelessly communicating via a predetermined number of distinct communication signals;
four directional antennas located around each of said base stations for receiving and transmitting the distinct communication signals within a predetermined directionality for said base stations, said four directional antennas collectively defining a cell for a corresponding one of said base stations, each of said four directional antennas singularly defining a sector for the corresponding cell, at least a pair of adjacent ones of said four directional antennas of the corresponding two adjacent ones of said base stations utilizing a common one of the distinct communication signals in a substantially mirror-image pattern; and
subscriber stations located in the cell for wirelessly communicating with a corresponding one of said base stations on one of the distinct communication signals.

24. The wireless telecommunication system according to claim 23 wherein said subscriber stations are fixedly located in a predetermined one of the sectors for transmitting one of the communication signals in a predetermined direction with respect to said base stations.

25. The wireless telecommunication system according to claim 23 wherein said directional antennas define the sectors in substantially equal four areas.

26. The wireless telecommunication system according to claim 23 wherein said directional antennas define the sectors in substantially rectangular areas.

27. The wireless telecommunication system according to claim 23 wherein said directional antennas define the sectors in substantially square areas.

28. The wireless telecommunication system according to claim 27 wherein said directional antennas define the cells in substantially square areas.

29. The wireless telecommunication system according to claim 28 wherein said directional antennas define the cells in staggered relations with each other.

30. The wireless telecommunication system according to claim 23 wherein said directional antennas define the sectors in substantially triangular areas.

31. The wireless telecommunication system according to claim 30 wherein said directional antennas define the sectors in substantially equal four areas.

32. The wireless telecommunication system according to claim 31 wherein said directional antennas define the cells in substantially square areas.

33. The wireless telecommunication system according to claim 23 wherein a number of the distinct communication signals is four.

34. The wireless telecommunication system according to claim 23 wherein the common one of the distinct communication signals is assigned to two pairs of two adjacent sectors of the corresponding two adjacent cells.

35. The wireless telecommunication system according to claim 34 wherein the common one of the distinct communication signals is assigned to four adjacent sectors of the corresponding four adjacent cells.

36. The wireless telecommunication system according to claim 23 wherein the distinct communication signals are each a combination of distinct frequencies and distinct communication wave directionalities.

37. The wireless telecommunication system according to claim 36 wherein two of the distinct communication signals are assigned to each of the sectors.

38. The wireless telecommunication system according to claim 23 wherein the distinct communication signals are four distinct frequencies as denoted by F1, F2, F3 and F4.

39. The wireless telecommunication system according to claim 38 wherein the four distinct frequencies have a relation as defined by F1<F2<F3<F4.

40. The wireless telecommunication system according to claim 38 wherein the four distinct frequencies have a relation as defined by F1>F2>F3>F4.

41. The wireless telecommunication system according to claim 23 wherein the four frequencies are assigned in order of F1, F4, F2 and F3 to the sectors of the cell.

42. The wireless telecommunication system according to claim 41 wherein the four frequencies F1, F4, F2 and F3 are assigned to the sectors in a clockwise direction.

43. The wireless telecommunication system according to claim 41 wherein the four frequencies F1, F4, F2 and F3 are assigned to the sectors in a counterclockwise direction.

44. The wireless telecommunication system according to claim 41 wherein a first difference between F2 and F3 is larger than a second difference between F1 and F2 and a third difference between F3 and F4.

45. A wireless telecommunication system, comprising:

base stations for wirelessly communicating via distinct communication signals;

plurality of directional antennas located around each of said base stations for receiving and transmitting the distinct communication signals for said base stations, said directional antennas collectively defining a cell for a corresponding one of said base stations, each of said directional antennas having a limited directionality for singularly defining an equal portion of the cell as a sector, a pair of adjacent ones of said directional antennas of the corresponding two adjacent sectors of said base stations utilizing a common one of the distinct communication signals in a substantially mirror-image pattern; and subscriber stations located in the cell for wirelessly communicating with a corresponding one of said base stations on one of the distinct communication signals.

46. A wireless telecommunication system, comprising:

base stations for wirelessly communicating via distinct communication signals;

a plurality of directional antennas located around each of said base stations for receiving and transmitting the distinct communication signals for said base stations, said directional antennas collectively defining a cell for a corresponding one of said base stations, each of said directional antennas having a limited directionality for singularly defining an equal portion of the cell as a sector, the plurality of said adjacent ones of said directional antennas of the corresponding adjacent ones of said base stations utilizing a common one of the distinct communication signals in a substantially mirror-image pattern; and subscriber stations located in the cell for wirelessly communicating with a corresponding one of said base stations on one of the distinct communication signals.

47. A wireless telecommunication system, comprising:

base stations for wirelessly communicating via distinct communication signals;

a plurality of directional antennas located around each of said base stations for receiving and transmitting the distinct combinations of frequencies and polarized waves for said base stations, said directional antennas collectively defining a cell for a corresponding one of said base stations, each of said directional antennas having a limited directionality for singularly defining an equal portion of the cell as a sector, the plurality of said adjacent ones of said directional antennas of the corresponding adjacent ones of said base stations utilizing a common one of the distinct combinations of the frequencies and polarized waves in a substantially mirror-image pattern; and subscriber stations located in the cell for wirelessly communicating with a corresponding one of said base stations on one of the distinct communication signals.

* * * * *